US008170417B2

(12) United States Patent
Liu et al.

(10) Patent No.: US 8,170,417 B2
(45) Date of Patent: May 1, 2012

(54) MECHANISM TO DETECT AN UNSTABLE WAVELENGTH CHANNEL AND LIMIT ITS IMPACT ON A ROADM NETWORK

(75) Inventors: Qingyun Liu, Round Rock, TX (US); Philip Wisseman, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 567 days.

(21) Appl. No.: 12/322,734

(22) Filed: Feb. 6, 2009

(65) Prior Publication Data
US 2010/0202777 A1    Aug. 12, 2010

(51) Int. Cl.
H04J 14/02    (2006.01)
H04B 10/08    (2006.01)
(52) U.S. Cl. ............................................ 398/83; 398/33
(58) Field of Classification Search .................... 398/83, 398/33
See application file for complete search history.

(56) References Cited

U.S. PATENT DOCUMENTS

| 5,770,836 | A  | * | 6/1998 | Weiss ............................ 219/481 |
| 7,424,223 | B1 | * | 9/2008 | Lundquist et al. ............. 398/49 |
| 2003/0002104 | A1 | * | 1/2003 | Caroli et al. ................... 359/127 |
| 2006/0104641 | A1 | * | 5/2006 | Casanova et al. ............... 398/83 |
| 2008/0089681 | A1 | * | 4/2008 | Yano ................................ 398/33 |
| 2008/0292312 | A1 | * | 11/2008 | Oron et al. ....................... 398/33 |
| 2009/0092391 | A1 | * | 4/2009 | Zong et al. ...................... 398/79 |
| 2009/0162054 | A1 | * | 6/2009 | Oguma ........................... 398/34 |
| 2010/0221004 | A1 | * | 9/2010 | Haslam et al. .................. 398/49 |

OTHER PUBLICATIONS

David Z. Chen, and Michael F.Lane, Emerging network need for Alien wavelength management, 2007, optical Society of America.*

* cited by examiner

Primary Examiner — Kenneth N Vanderpuye
Assistant Examiner — Amritbir Sandhu

(57) ABSTRACT

A system and method for limiting the impact of an unstable wavelength on other wavelengths in a reconfigurable optical add/drop multiplexer (ROADM) network are disclosed. The method generally comprises measuring optical channel power at prescribed time intervals; for each measurement of channel power falling outside a predefined threshold, recording a threshold crossing event; comparing the recorded threshold crossing events to stored criteria indicative of an unstable wavelength channel; and removing an unstable wavelength from the ROADM network if the threshold crossing events exceed the stored criteria.

16 Claims, 10 Drawing Sheets

TO FIG. 3(CONTINUED)

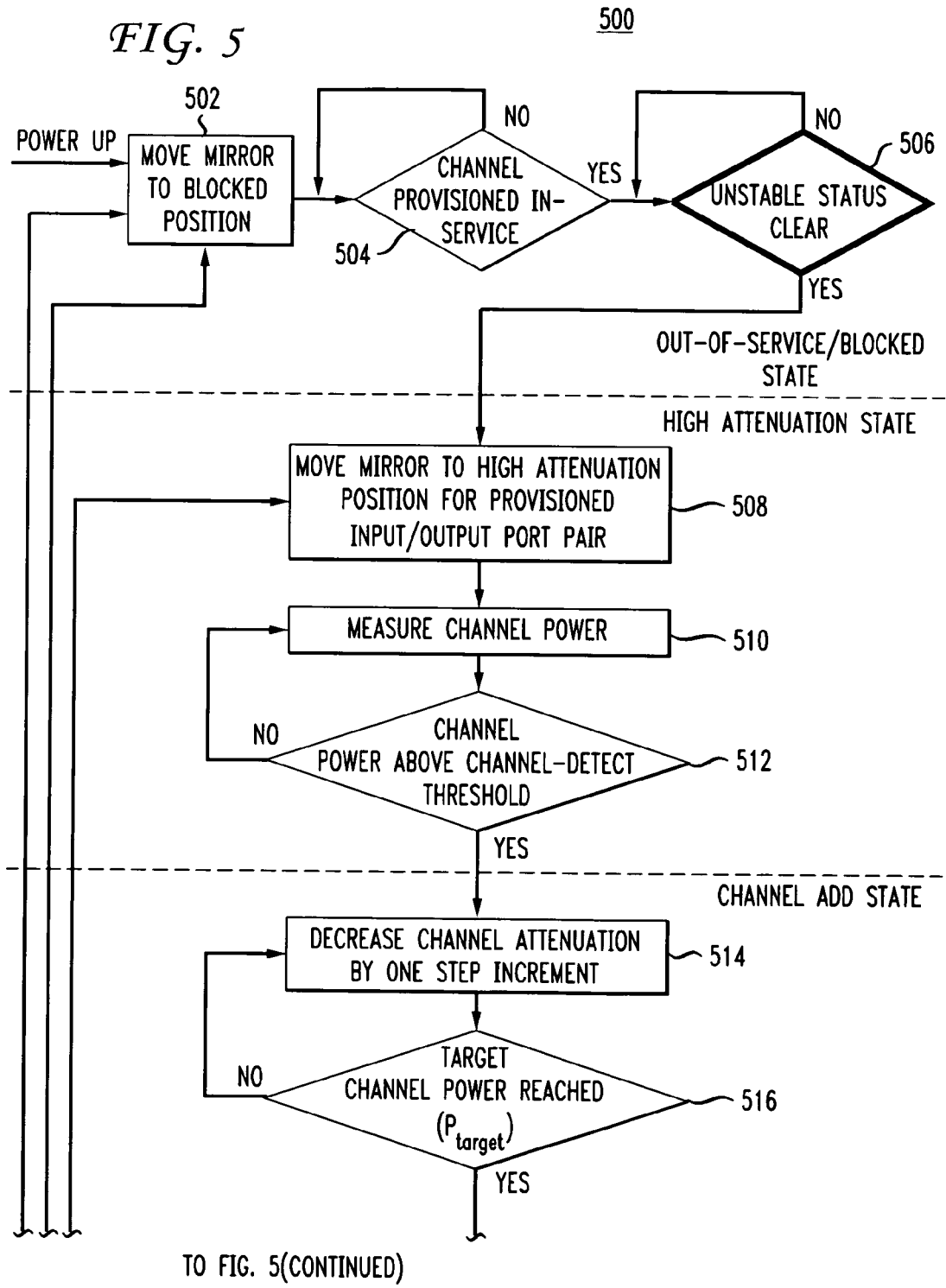

MECHANISM TO DETECT AN UNSTABLE WAVELENGTH CHANNEL AND LIMIT ITS IMPACT ON A ROADM NETWORK

FIELD OF THE INVENTION

The present invention relates generally to optical networks, and more particularly, to systems and methods for detecting an unstable wavelength channel and limiting its impact on the other channels in a wavelength division multiplexing (WDM) optical network comprising a plurality of reconfigurable optical add/drop multiplexers (ROADMs).

BACKGROUND OF THE INVENTION

In less than a decade, the state of the art in fiber-optic transport systems has progressed from simple point-to-point chains of optically amplified fiber spans to massive networks with hundreds of optically amplified spans connecting transparent add-drop nodes spread over transcontinental distances. Cost reduction has been the primary driver for this transformation, and the primary enabler has been the emergence of the ROADM as a network element (NE).

Exploiting the inherent wavelength granularity of wavelength-division multiplexing, an optical add/drop multiplexer (OADM) allows some WDM channels (also referred to as wavelengths) to be dropped at a node, while the others traverse the same node without electronic regeneration. Previously, it was necessary to terminate line systems at each node served, and then regenerate the wavelength signals destined for other nodes. The ability to optically add/drop a fraction of a system's wavelengths at a node was first achieved using fixed OADMs. These were constructed from optical filters, and by enabling wavelengths to optically bypass nodes and eliminate unnecessary regeneration, they provided significant cost savings. However, because traffic growth is inherently unpredictable, it is advantageous for the add-drop capability to be reconfigurable.

ROADMs provide many advantages beyond the savings achieved by optically bypassing nodes. In the future, multi-degree ROADMs with adequate reconfiguration speeds may enable shared-mesh restoration at the optical layer. Shared mesh restoration significantly reduces the number of wavelength channels that must be installed as redundant protection circuits. ROADMs also provide operational advantages. Because ROADMs can be reconfigured remotely, they enable new wavelength channels to be installed by simply placing transponders at the end points, without needing to visit multiple intermediate sites. In addition to these cost-saving benefits, ROADMs will enable new services. For example, if transponders are preinstalled, then new circuits can be provided on-demand. The rapid network reconfiguration provided by ROADMs could also become an enabler of dynamic network services, such as switched video for IPTV. For all of these reasons, ROADMs will continue to have a significant effect on the design of optical networks.

FIG. 1 is a schematic illustration of a prior art ROADM node 100 showing the control loops employed in a typical configuration. The drawing depicts one direction of a typical multi-degree ROADM node, which includes multiple control loops to control the power of wavelengths through the node. In today's networks, optical links are typically bidirectional, so each port really represents a pair of fibers. When using conventional local transceivers that can process only a single wavelength at a time, the number of fibers in the add/drop port sets the maximum number of wavelengths that can be added or dropped at a given node. Wavelengths from a remote ROADM node enter on the network fiber port 102 on the left prior to dropping an Optical Supervisory Channel (OSC) at 104. The signals enter one optical amplifier 106 or a series of optical amplifiers 106, 110, which may be preceded by a variable attenuator 108 to control the input power. Multiple optical taps with photodetectors (PD), each shown as 112, are used to monitor the power and support active control of the amplifier input power 114 and gain 116. The wavelengths are then split using a passive optical splitter (PS) or wavelength selective switch (WSS) 118 to either drop at the demultiplexer 120, or connect to an output network degree via couplings shown at 122. Wavelengths added to the ROADM 100 may either be provided by external wavelength sources or local transponder(s) 124, which may include laser power control loop 126 and wavelength control loop 128. A WSS 130 for each network output is used to combine the add wavelengths from a multiplexer 132 and wavelengths from the input network degrees 134. WSS 130 also provides per-channel variable attenuation. An optical channel monitor 136 at the output of the WSS measures the power of each wavelength, and this data is used to adjust the attenuation of the WSS to balance the channel powers. The wavelengths then typically pass through an output optical amplifier 138, which may also include gain control loop 140 or output channel power control loop 142. Finally, an OSC channel 144 may be added to the outgoing optical signal as it exits the ROADM node 100. A similar optical path and control loops are also typically used by 2-degree ROADM nodes (not shown), where the multi-degree splitter and WSS are replaced by 2×1 components that also provide per-channel variable attenuation (e.g., a PLC ROADM). A control loop processor (CLP) 146, shown as a single element but alternatively configured in multiple specific individual elements, executes control loop functionality based in part on inputs 148 (represented by down arrows) and the channel power control loop (CPCL) configuration, for example computer code, which results in outputs 150 used to adjust or modify specific ROADM Node 100 elements and/or overall performance or functionality. Examples of inputs to the CLP 146 are information or data from elements such as PDs 112 and OCM 136. Examples of outputs (represented by up arrows) from the CLP 146 are information or data to control elements such as optical amplifiers 106 and 138, and variable attenuator 108.

As shown in FIG. 1, multiple control loops are used along the wavelength path through a ROADM node to compensate for span loss changes, adjust amplifier gain, control transponder output power and wavelength, and balance channel power levels to compensate for wavelength dependant losses and amplifier gain tilt. A wavelength channel within a ROADM network can therefore traverse a large number of cascaded control loops as it passes through multiple nodes. While the ROADM system should be designed to avoid unwanted interactions between these cascaded control loops and prevent cross-channel interference in the event of a failure within the network, this has proven to not always be the case. The response times, power thresholds, etc. for these control loops are typically designed based on the system features and requirements envisioned at the time of the initial design and for known failure mechanisms.

However, new or modified features and requirements as well as unforeseen failure mechanisms have shown the need for a capability to both detect unstable wavelengths and protect against cross-channel interference. This will continue to become more important as ROADM systems continue to increase in tenability and flexibility and support alien wavelengths.

One specific example is a case where an unexpected failure mode within a tunable laser results in very rapid transitions between two lasing modes (wavelengths). This typically results in oscillations between the states within the channel power control loop and very rapid and large fluctuations in the channel power. This then impacts other channels at the downstream amplifiers. Troubleshooting this type of failure is complicated by the impact on multiple channels that add and drop at different nodes within the ROADM network, making it difficult to isolate the failed channel.

Current CPCL configuration of ROADM networks typically responds to the out-of-range instantaneous channel input power level by simply blocking and opening/attenuating of the channel. This may or may not actually solve the problem with the channel, but may instead be a symptom of the problem. For example, if there is a problem with an amplifier which is amplifying the signal prior to being received at a ROADM, the channel input power level could be excessively high, and the receiving ROADM with existing CPCL configuration would simply block the channel, and reopen it at a later time. In this example, blocking the channel does not solve the problem of the troubled amplifier or give the network administrator/engineer an indication that there even is a problem. Additionally, network capacity is reduced, as the fiber (or fiber pair, as determined by network configuration) is now no longer carrying network traffic.

FIG. 2 shows a typical prior art state diagram 200 for the power control loop of each output wavelength channel that monitors the channel power and controls the variable attenuation of the output WSS in FIG. 1. The system starts at the Shutdown state 202, powering up, initializing the Out-of-Service/Blocked state 204 with the maximum channel attenuation. When a wavelength channel between an input and output port is provisioned in-service, the corresponding WSS connection is established in the High Attenuation state 206 where the presence of the channel can be detected without risk of impacting other wavelengths on the network. When the channel optical power exceeds the channel detect threshold level, the control loop enters the Channel Add state 208, where the attenuation is slowly decreased until the target optical power level is achieved. Once the target power level is reached, the state transitions to the Channel Level Control state 210 where the attenuation is adjusted to maintain the power within the operating window. The channel may be provisioned out of service by going directly from the Channel Level Control state 210 to the Out-of-Service/Blocked state 204, where the system can then be either powered down by going to the Shutdown state 202 or a channel can be re-provisioned in service per the High Attenuation state 204. Alternatively, while at the Channel Level Control state 210, if the power moves outside this window (e.g., loss of light) the control loop will return to the High Attenuation state 208 to either provision the channel out of service, going to the Out-of-Service/Blocked state 204 and then to the Shutdown state 202, or try and detect channel power, moving to the Channel Add state 208 with the goal of reaching target power and returning to the Channel level Control state 210. Thus, the system can repeatedly go through the cycles of blocking, opening and attenuating the input power depending on the instantaneous power detected.

For managing the performance of high capacity optical switching and transmission WDM networks, optical performance monitoring (OPM) systems, sometimes referred to as an optical channel monitor (OCM) are used. OPM involves determining the quality of optical channel(s) within the WDM network by measuring optical characteristics without examining the transmitted sequence of data bits, assuring data security. OPM may include ensuring correct switching in ROADMs, setting levels for dynamic equalization of the gain of optical amplifiers and providing system alarms and error warning for lost or out of specification optical channels. Typical parameters measured are channel power, polarization dependent loss, wavelength and optical signal-to-noise ratio (OSNR) for each channel.

FIG. 3 is a high-level flow diagram 300 of a prior art channel power control loop. This diagram is stated in terms of a MEMs based WSS (i.e., mirrors used for channel connections and attenuation control), but would also apply for other WSS technologies, as known by those skilled in the art. Steps 302 and 304 comprise the Out-of Service/Blocked state. The flow method 300 starts when the system is powered up and the mirror is moved to the blocked channel position 302. In step 304, a channel provisioned in-service check is performed before moving to step 306.

Steps 306 through 310 comprise the High Attenuation state. At step 306, the mirror is moved to the High Attenuation position for provisioned input/output port pairing. At Step 308 the channel power is measured. At step 310, if the channel power is not above the channel-detect threshold, the process returns to step 308 where the channel power is measured. If at step 310 the channel power is above the channel-detect threshold, the process moves to step 312.

Steps 312 and 314 comprise the Channel Add state. At step 312 the channel attenuation is decreased by one incremental step. At step 314, if the target channel power ($P_{target}$) is not reached, the process returns to step 312 where the channel attenuation is again decreased by one incremental step. If at step 314 the target channel power ($P_{target}$) is reached, the process moves to step 316.

Steps 316 through 326 comprise the Channel Level Control state. At step 316 the channel power ($P_{meas}$) is measured. At step 318, if $P_{meas}$ is not between Max and Min power thresholds, the process moves to step 320 where the threshold crossing alert is raised, and the process returns to step 306. If at step 318 $P_{meas}$ is between Max and Min power thresholds, the process moves to step 322. At step 322, if ($P_{meas}-P_{target}$) is greater than attenuation step increment, the process moves to step 324 where the attenuation is adjusted to set the channel power to the target level, and the process moves to step 324. If at step 322 ($P_{meas}-P_{target}$) is not greater than attenuation step increment, the process moves directly to step 326. At step 326, if the channel is not provisioned Out-of-Service, the process returns to step 316. If at step 326 the channel is provisioned Out-of-Service, the process returns to step 302 where the mirrors are moved to the blocked position.

In other words, once the system is in the Channel Power Control state, if the power level measured by the optical channel monitor crosses the Max or Min operating level threshold the WSS will return to the High Attenuation state. The channel will automatically recover if the power level moves back above the channel detect threshold. Note: Channel Detect Threshold (dBm)>(Minimum Operating Threshold (dBm)−Attenuation Added for High Attenuation State (dB)+Maximum Power Measurement Error (dB)).

An unstable wavelength channel on a ROADM network can create power level surges which may not only impact the channel directly, but may impact other channels on the same network as well. Current CPCL configurations in a ROADM network, within a device such as a CLP 146 of FIG. 1, are designed and implemented to block and open a wavelength channel based primarily on the instantaneous channel input power level. Certain failure modes on a wavelength channel can cause the CPCL to repeatedly go through the blocking and opening cycles and/or repeatedly create excessive power fluctuations (sudden surges and falls) on the channel output to the extent that performance parameters, those discussed earlier, of other channels on the ROADM network may be impacted.

Excessive optical power fluctuations, i.e., surges over X db, where X depends on the CPCL configuration of the CLP for the specific ROADM system, on some wavelength channel(s) can interfere with other channels on a ROADM network to the extent of network-wide degradation and outages. Current CPCL configurations typically react in an uncorrelated manner to input power changes that occur within a specified time period, i.e. milliseconds to seconds. If the input power fluctuations occur repetitively at a certain frequency, either in or out of the control loop cycle range, the typical CPCL configuration cannot recognize the pattern and will simply go through repeated cycles of blocking, opening and attenuating of the input optical power depending on the instantaneous power detected. Network outages have been reported in the field with lengthy manual trouble isolation and service restoration efforts involved as a result of certain laser failure mode that repeatedly created input power surges into the control logic.

It would therefore be desirable to provide systems and methods that improve the CPCL configuration of a ROADM network, with the ability to detect an unstable wavelength channel by comparing actual performance patterns to predetermined performance patterns and rules to recognize and respond to the patterns and rules, and by taking pre-determined action(s) to avoid network-wide degradation and outages. To the inventors' knowledge, no such system or method currently exists.

SUMMARY OF THE INVENTION

In accordance with a first aspect of the invention, there is provided a method for limiting the impact of an unstable wavelength on other wavelengths in a reconfigurable optical add/drop multiplexer (ROADM) network. The method generally comprises: measuring optical channel power at prescribed time intervals; for each measurement of channel power falling outside a predefined threshold, recording a threshold crossing event; comparing the recorded threshold crossing events to stored criteria indicative of an unstable wavelength channel; and removing an unstable wavelength from the ROADM network if the threshold crossing events exceed the stored criteria.

In one expedient, the predefined thresholds comprise maximum or minimum power thresholds and the criteria indicative of an unstable wavelength channel comprise a plurality of channel power measurements falling outside the maximum or minimum power thresholds within a specified time window.

Alternatively, the threshold crossing events comprise variations in measured channel power over a specified time window and the criteria indicative of an unstable wavelength channel comprises changes in channel power over a specified time window.

In yet another embodiment, the comparison of recorded threshold crossing events to the stored criteria is determined by a deviation relative to initial channel power, determined by previously measured channel power, or by a sliding average channel power.

In still another embodiment, multiple criteria for an unstable wavelength are defined as a function of threshold crossing event frequency, event time history window, and power deviation magnitude.

The step of removing the unstable wavelength from the ROADM network further includes moving a mirror in a WSS to a blocked position.

In accordance with another aspect of the invention, there is provided a system for limiting the impact of an unstable wavelength on other wavelengths in a reconfigurable optical add/drop multiplexer (ROADM) network, comprising: an optical measurement device that measures optical channel power at prescribed time intervals; and a controller that records a threshold crossing event for each measurement of channel power falling outside a predefined threshold, compares the recorded threshold crossing events to stored criteria indicative of an unstable wavelength channel; and removes an unstable wavelength from the ROADM network if the threshold crossing events exceed the stored criteria.

These aspects of the invention and further advantages thereof will become apparent to those skilled in the art as the present invention is described with particular reference to the accompanying drawings.

DETAILED DESCRIPTION OF THE INVENTION

Embodiments of the invention will be described with reference to the accompanying drawing figures wherein like numbers represent like elements throughout to the extent possible. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Aspects of the present invention provide improved monitoring and detection of unstable wavelengths in a ROADM system by recognizing and responding to predetermined performance patterns that meet the criteria for an unstable wavelength, including but not limited to, repetitive power fluctuations over time. The recognition of such patterns allows for appropriate action to be taken to limit the network impact of disruptive wavelength channel(s). Patterns of actual power (i.e., input, output or some combination) values at the CPCL are stored over multiple control loop logic (including state transition) cycles, and observed patterns are compared against a predefined set of patterns and rules to detect unacceptable conditions and allow for prescribed actions to be undertaken. Specifically, the rules define acceptable channel parameter fluctuation levels, ranges and/or frequencies, which are to be enforced with a predefined set of arrays or logics.

Figure 4:
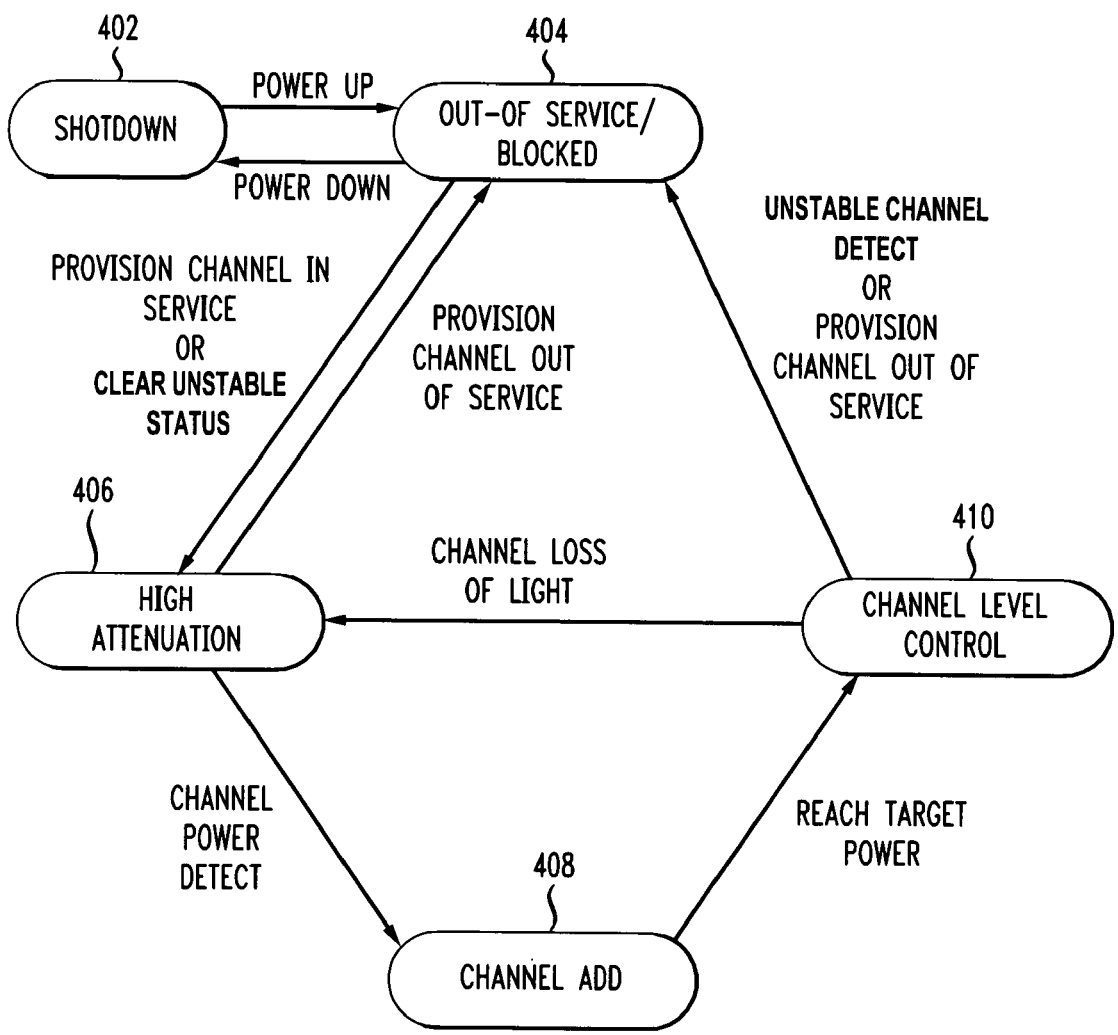
FIG. 4 is a state diagram of a power control loop in accordance with aspects of the present invention.

FIG. 4 is a state diagram 400 for a power control loop of a ROADM node in accordance with an aspect of the present invention. At power-up, the system moves from the Shutdown State 402 and initializes the Out-of-Service/Blocked state 404 with the maximum channel attenuation. When a wavelength channel between an input and output port is provisioned in-service, the corresponding WSS connection is established in the High Attenuation state 406 where the presence of the channel can be detected without risk of impacting other wavelengths on the network. When the channel optical power exceeds the channel detect threshold level, the control loop enters the Channel Add State 408, where the attenuation is slowly decreased until the target optical power level is achieved. Once the target power level is reached, the state transitions to the Channel Level Control State 410 where the attenuation is adjusted to maintain the power within the operating window. In accordance with the invention, if an unstable channel is detected as described in more detail hereinbelow, the control loop will go from the Channel Level Control state 410 to the Out-of-Service/Blocked state 404 and the unstable channel is temporarily blocked. Manual intervention is then required to clear the unstable status. The logic then proceeds as known for the channel to transition to the High Attenuation State in block 406. It will be understood by those skilled in the art, that while at the Channel Level control state 410, if the power moves outside the operating window (e.g., loss of light) the control loop will return to the High Attenuation state 406 to either provision the channel out of service, going to the Out-of-Service/Blocked state 404, or will try and detect channel power, moving to the Channel Add state 408 with the goal of reaching target power and returning to the Channel level Control state 410.

Figure 5:
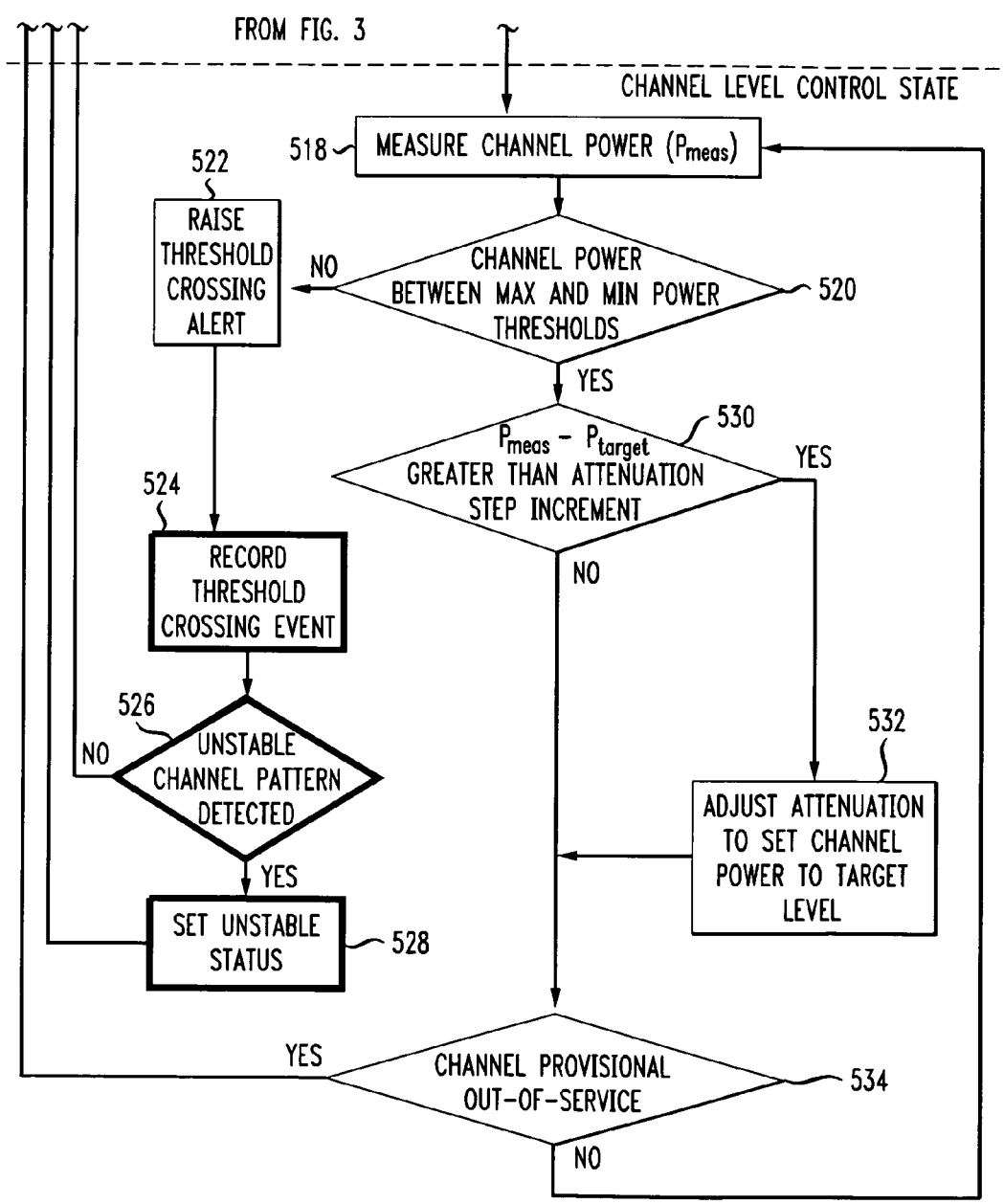
FIG. 5 is a high-level flow chart of a channel power control loop in accordance with aspects of the present invention.

FIG. 5 is a high-level flow diagram 500 for a channel power control loop in accordance with the present invention. Here again, the flow chart shown in FIG. 5 is stated in terms of a MEMs based WSS (i.e., mirrors used for channel connections and attenuation control), but would also apply for other WSS technologies, as known by those skilled in the art. Steps 502 through 506 comprise the Out-of Service/Blocked state. The flow 500 starts when the system is powered up and the mirror is moved to the blocked channel position 502. In step 504, a channel provisioned in-service check is performed before moving to step 506. In step 506, an unstable status clear check is performed before moving to step 508.

Steps 508 through 512 comprise the High Attenuation State. At step 508, the mirror is moved to the High Attenuation position for provisioned input/output port pairing. At Step 510 the channel power is measured. At step 512, if the channel power is not above the channel-detect threshold, the process returns to step 510 where the channel power is measured. If at step 512 the channel power is above the channel-detect threshold, the process moves to step 514.

Steps 514 and 516 comprise the Channel Add state. At step 514 the channel attenuation is decreased by one incremental step. At step 516, if the target channel power ($P_{target}$) is not reached, the process returns to step 514 where the channel attenuation is again decreased by one incremental step. If at step 516 the target channel power ($P_{target}$) is reached, the process moves to step 518.

Steps 518 through 534 comprise the Channel Level Control state. At step 518 the channel power ($P_{meas}$) is measured. At step 520, if $P_{meas}$ is not between Max and Min power thresholds, the process moves to step 522 where the threshold crossing alert is raised, followed by step 524 where the threshold crossing event is recorded, followed by step 536 where a check for an unstable pattern is performed. If at step 526 an unstable pattern is detected, step 528 sets an unstable status indicator, and the process returns to step 502 where the mirror is moved to the blocked position. If at step 526 no unstable pattern is detected, the process returns to step 508. If at step 520 $P_{meas}$ is between Max and Min power thresholds, the process moves to step 530. At step 530, if ($P_{meas}-P_{target}$) is greater than attenuation step increment, the process moves to step 532 where the attenuation is adjusted to set the channel power to the target level, and the process moves to step 534. If at step 530 ($P_{meas}-P_{target}$) is not greater than attenuation step increment, the process moves directly to step 534. At step 534, if the channel is not provisioned Out-of-Service, the process returns to step 518. If at step 534 the channel is provisioned Out-of-Service, the process returns to step 502 where the mirrors are moved to the blocked position.

Figure 1:
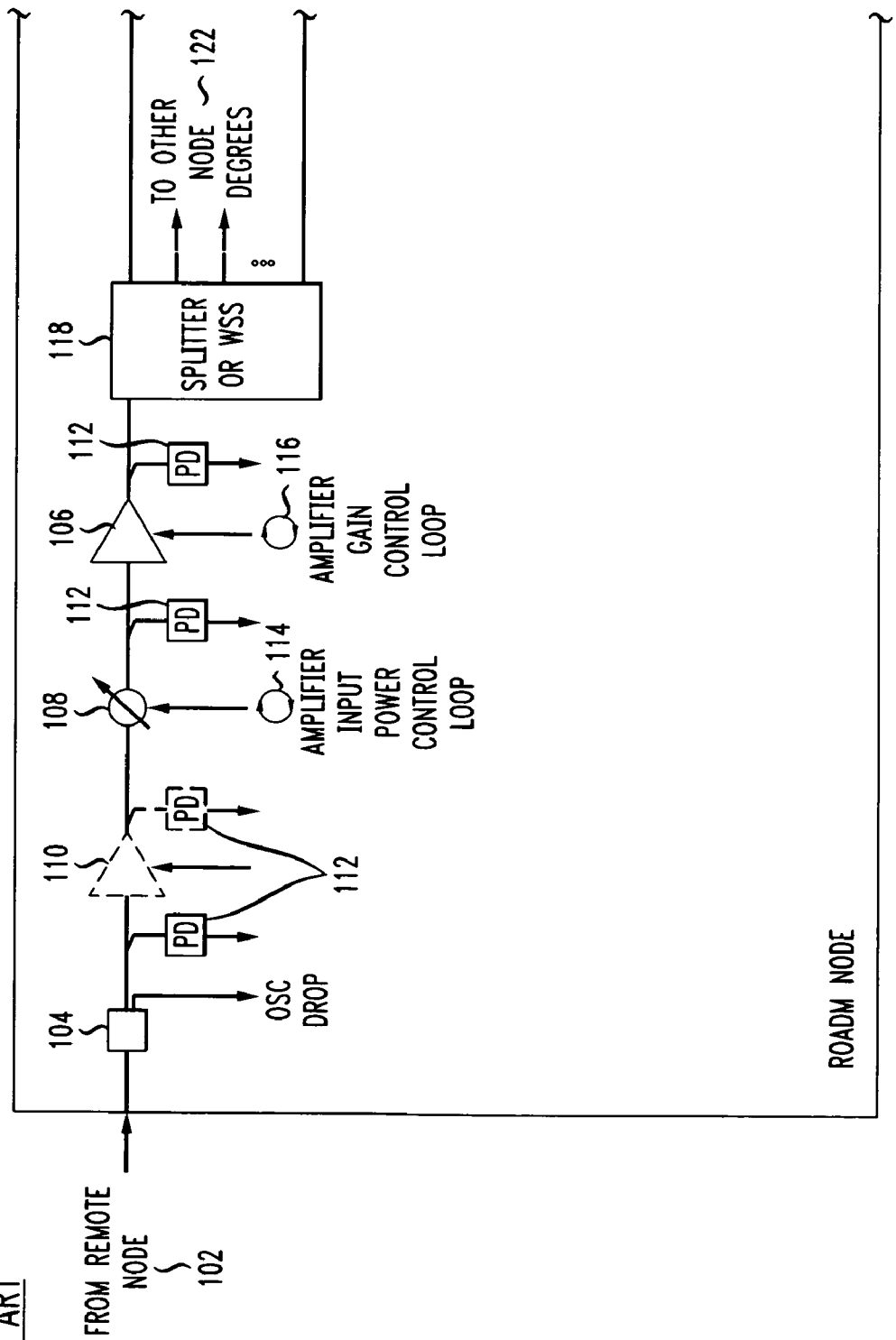
FIG. 1 is an illustrative schematic of control loops in a typical ROADM node configuration.
Figure 1:
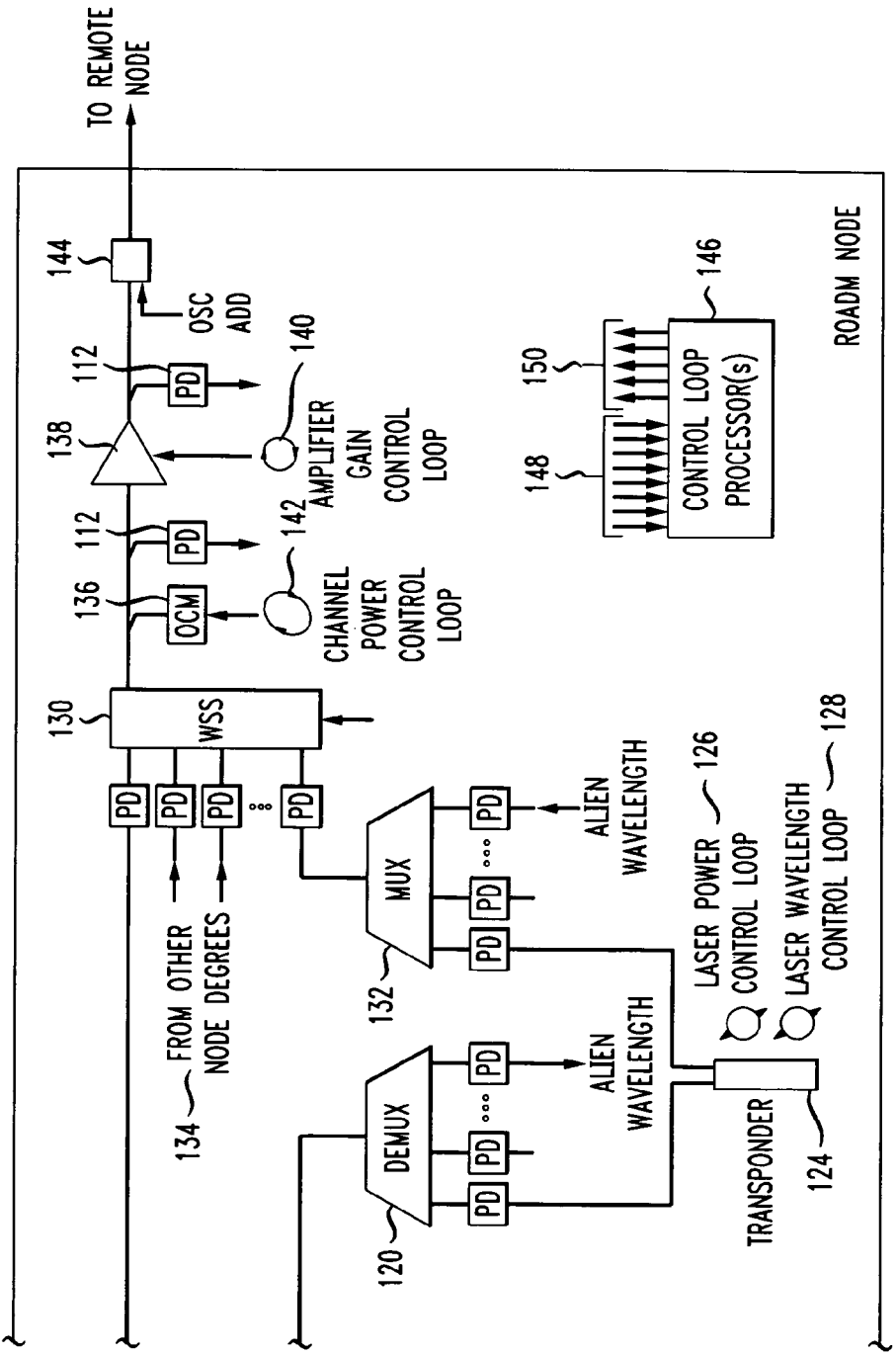
Figure 2:
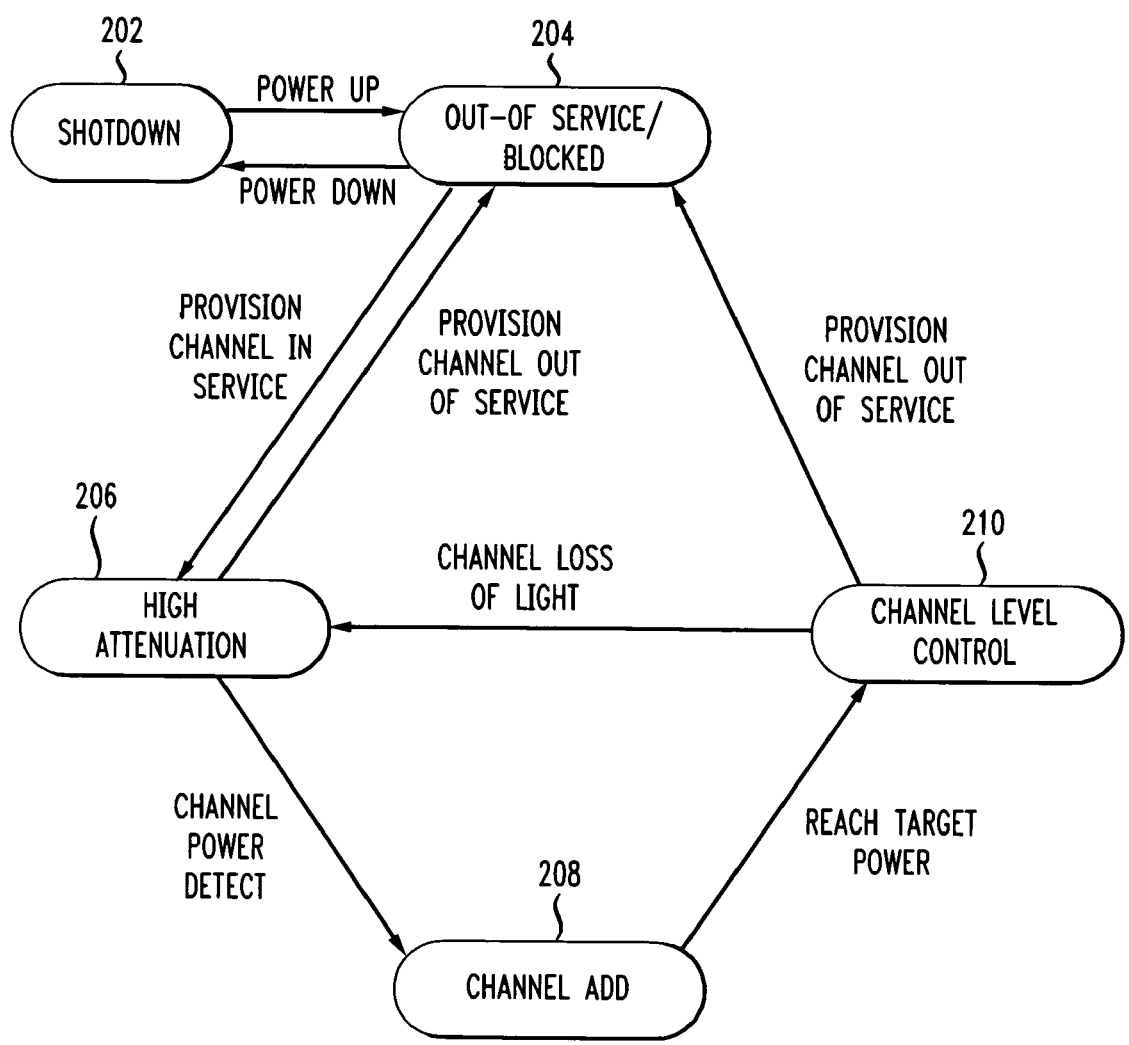
FIG. 2 is a state diagram for the power control loop with reference to FIG. 1.
Figure 3:
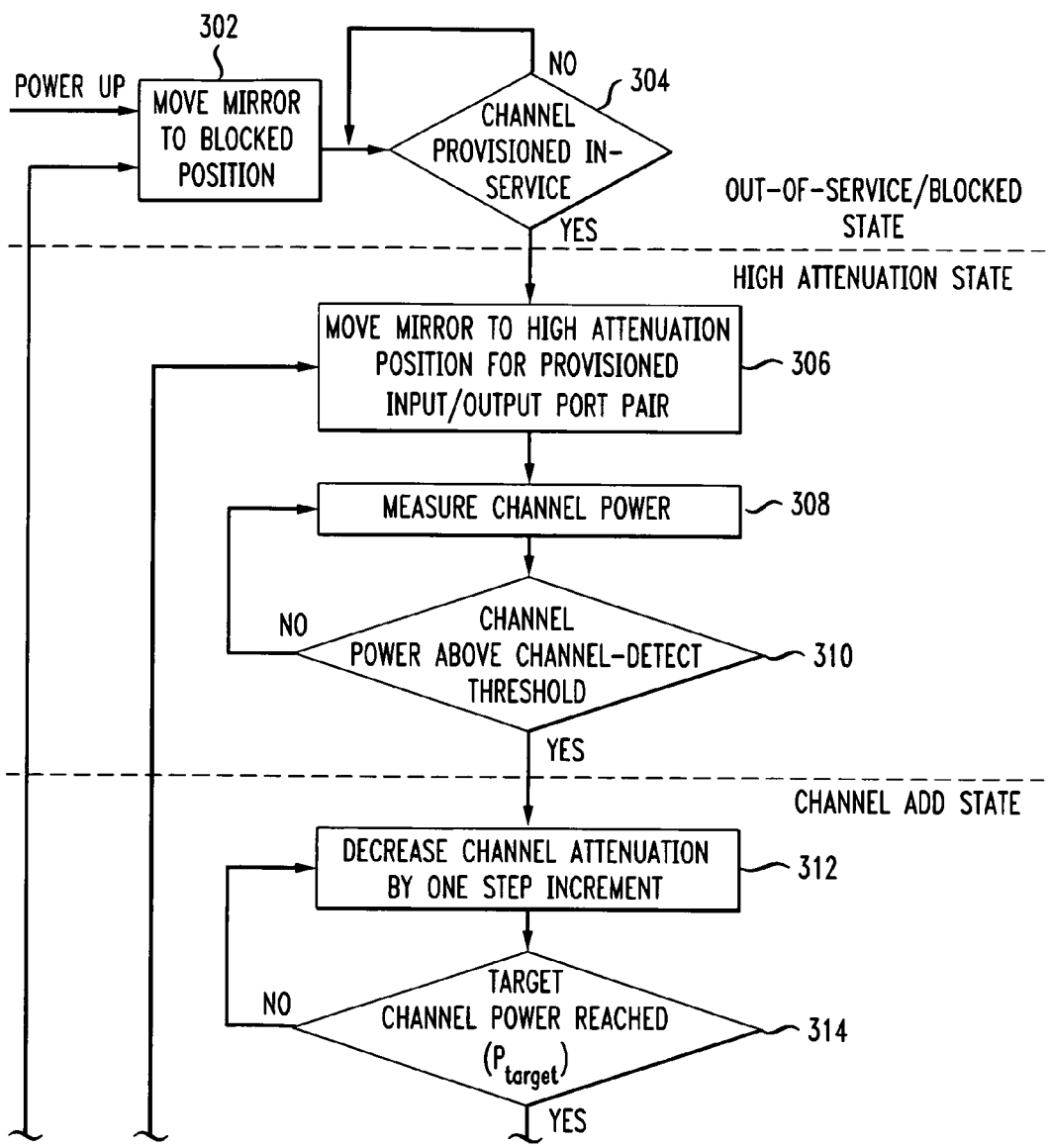
FIG. 3 is a high-level flow diagram of a known channel power control loop.
Figure 3:
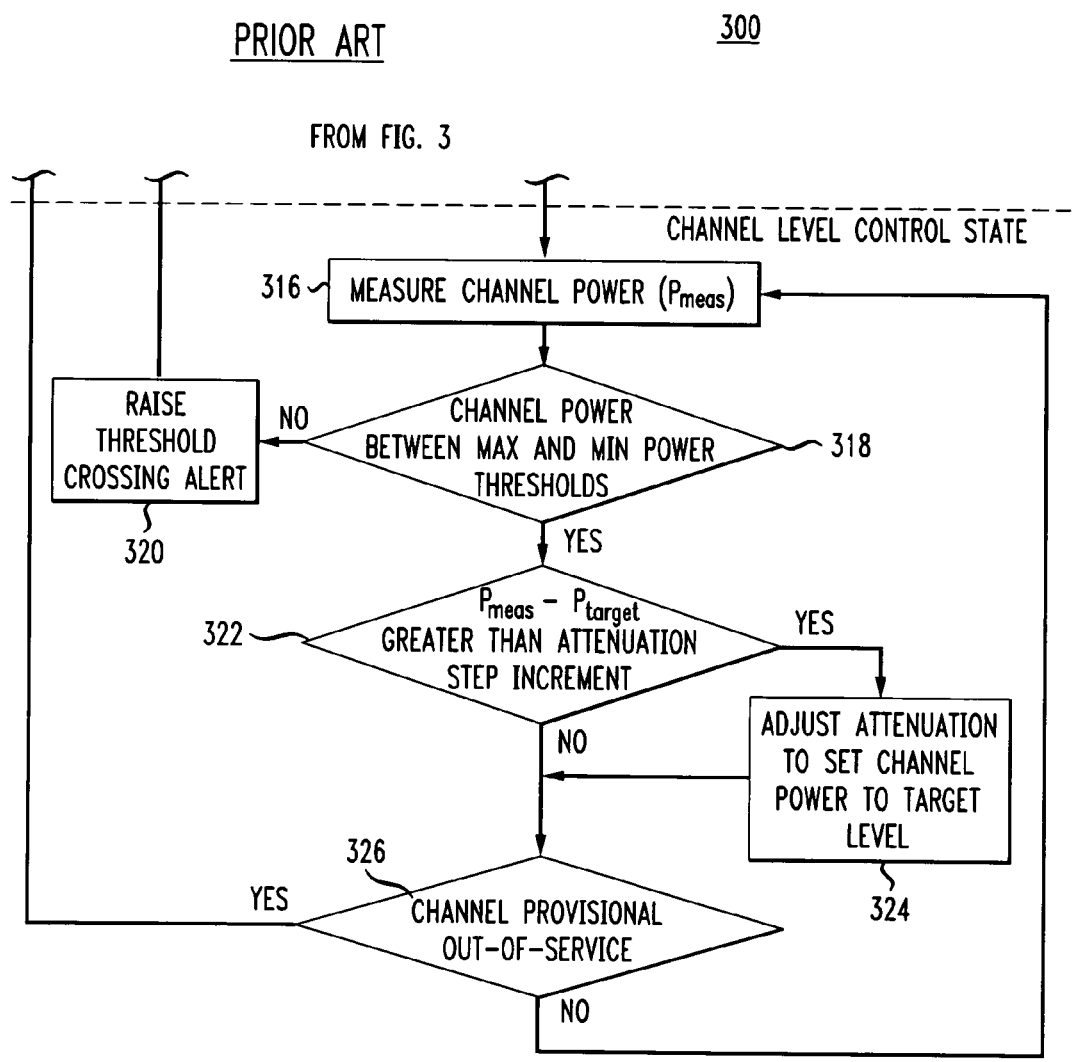

In other words, the transition from the Out-of-Service/Blocked state is only allowed if the unstable status is clear. While in the Channel Level Control state, if the measured channel power moves outside the operating power range then a threshold crossing alert is raised and the threshold crossing event is recorded in memory. At a minimum the stored event information includes the time of the threshold crossing measurement. If the stored history of threshold crossing events meets the criteria for an unstable wavelength, as per the pre-determined CPCL performance patterns and rules, then the unstable channel status is set and the channel power control loop moves to the Out-of-Service/Blocked state, otherwise the control loop moves to the High Attenuation state as described in FIG. 3 as part of the prior art.

Figure 6:
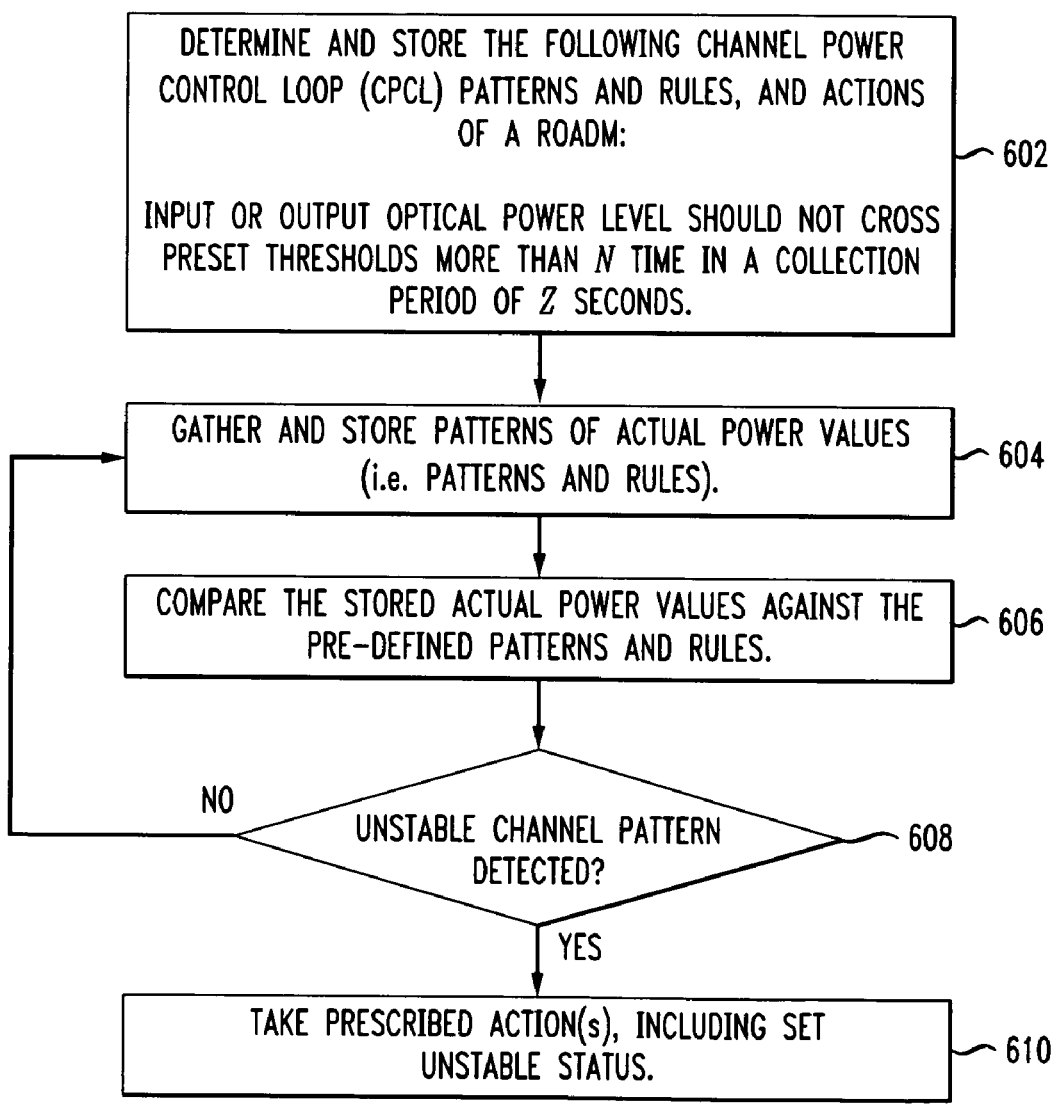
FIG. 6 is a flow diagram of an exemplary method in accordance with an aspect of the present invention.
Figure 7:
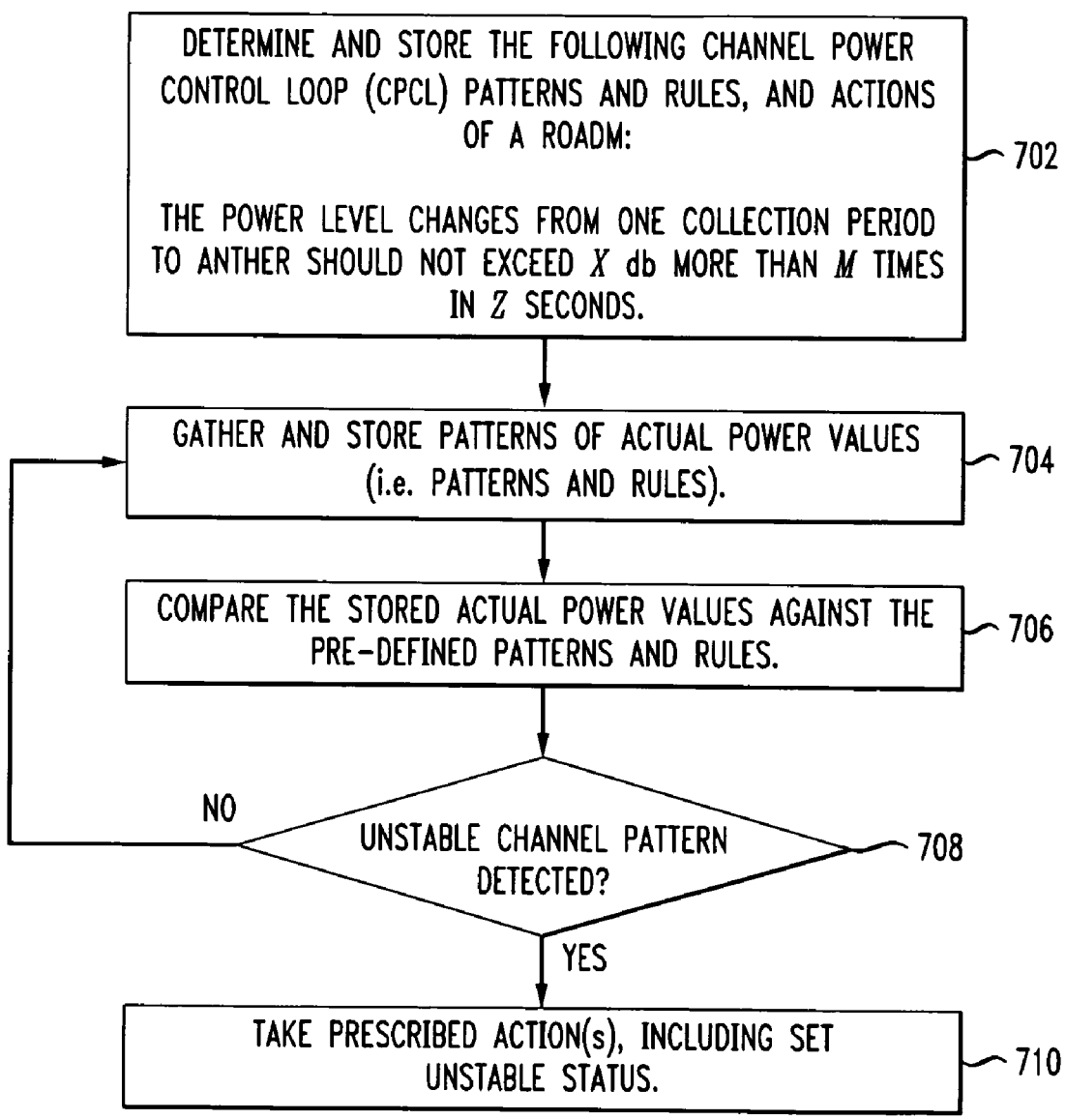
FIG. 7 is a flow diagram of an exemplary method in accordance with another aspect of the present invention.

FIGS. 6 and 7 disclose exemplary methods in accordance with the present invention with specific patterns, rules and actions of a ROADM. These methods are exemplary, and are in no way limiting the types of patterns, rules and actions of the present invention.

FIG. 6 is an exemplary method 600 in accordance with an aspect of the present invention. The method starts at step 602, where the patterns and rules, and actions of a ROADM are determined and stored. In this illustrative method a rule is affected such that the input or output optical power level should not cross preset thresholds more than N times in a collection period of Z seconds.

At step 604, actual power values (i.e. patterns and rules) are gathered and stored.

At step 606, pre-determined patterns and rules determined and stored in step 602 are compared to actual power values gathered in step 604.

At step 608, unstable channel patterns are detected, as a result of the comparison of step 606. If the comparison yields a negative result, the logic loops back to step 604. If the comparison yields a positive result, the prescribed actions are taken, as determined in step 602, are executed.

FIG. 7 is an exemplary method 700 in accordance with an aspect of the present invention. The method starts at step 702, where the patterns and rules, and actions of a ROADM are determined and stored. In this method a rule is affected such that the power level changes from one collection period to another should not exceed X db more than M times in Z seconds.

The rest of the steps of method 700 (steps 704-710) are the same as those of method 600 (steps 604-610). At step 704, actual power values (i.e. patterns and rules) are gathered and stored.

At step 706, pre-determined patterns and rules determined and stored in step 602 are compared to actual power values gathered in step 704.

At step 708, unstable channel patterns are detected, as a result of the comparison of step 706. If the comparison yields a negative result, the logic loops back to step 704. If the comparison yields a positive result, the prescribed actions are taken, as determined in step 702, are executed.

In an alternative embodiment, the system will capture and store Y number of channel power readings at the control loop input and/or output over a collection period of Z seconds, with the values of Y and Z a function of the stability and detection time required. The array of readings will be examined for unacceptable power level fluctuations against the set of pre-defined rules. The channel will be blocked accordingly if it is deemed unstable and disruptive to the network based on the predefined rules. Either manual action or a longer integration timer than Y is required for the channel to come out of the blocked state. By correlating multiple optical power level readings over a collection period with the predefined rules, the ROADM system will be able to detect and report the presence of an unstable channel automatically within minutes or seconds comparing to hours of manual trouble isolation. The automatic channel blocking based on the unstable channel detection by the ROADM system will also limit the network-wide impact to minutes or seconds instead of hours.

In another alternative embodiment, by detecting multiple threshold crossings within a particular time window (e.g., five threshold crossings within an hour) the unstable channel can be detected and disabled to prevent further impact on the other channels. The number and magnitude of threshold crossings and the time window for identifying an unstable channel are dependent on the details of the ROADM system design, such as the optical power and noise budget allocations, the amplifier gain and noise versus input power, and the sampling rate of the optical channel monitor. For example, systems with a lower sampling rate for the optical channel monitor will need a longer time window since some fast transitions may not be detected. At the same time, the system must be able to differentiate between an unstable channel and power changes caused by maintenance and troubleshooting operations such as pulling and replacing fiber connections or cable splice repairs to ensure that channels are not erroneously moved to the blocked state.

In yet another alternative embodiment, if the operating power range is designed based on gradual power variations but the system is determined to be potentially at risk from rapid variations within the operating range, then separate decision steps may be used for triggering a threshold crossing alert and moving to the High Attenuation state and for recording a threshold crossing event for detecting an unstable wavelength. Additionally, the threshold crossing may be determined by a deviation relative to the initial channel power, the previously measured power, or a sliding average power rather than by a fixed operating range. For these embodiments, the stored event information should include the power measurement data.

In yet a final embodiment, multiple criteria for an unstable wavelength may be defined as a function of the threshold crossing event frequency, event history time window, and power deviation magnitude.

An adaptation of the present invention may include more computer systems capable of carrying out the functionality described herein. An exemplary computer system of the type known in the art includes one or more processors connected to a communication infrastructure (e.g., a communications bus, cross-over bar, or network). The computer system can include a display interface (e.g. a graphics card) that allows graphics, text, and other data from the communication infrastructure or from a frame buffer to be displayed on a display unit. The computer system also includes a main memory, preferably random access memory (RAM), and may also include a secondary memory. The secondary memory may include, for example, a hard disk drive and/or a removable storage drive. The removable storage drive has read/write functionality onto removable storage media having stored therein computer software and/or data. In alternative embodiments, secondary memory may include other similar devices for allowing computer programs or other instructions to be loaded into the computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to the computer system. The computer system may also include a communications interface allowing software and data to be transferred between computer system and external devices. Examples of a communications interface may include a modem, a network interface (such as an Ethernet card), a communications port, a Personal Computer Memory Card International Association (PCMCIA) slot and card, etc. Software and data transferred via the communications interface are in the form of signals which may be electronic, electromagnetic, optical or other signals capable of being received by the communications interface. These signals are provided to communications interface via a communications path or channel, which carries the signals and may be implemented using wire or cable, fiber optics, a telephone line, a cellular link, a radio frequency (RF) link and/or other communications channels. Computer programs (also referred to as computer control logic) are stored in a main memory and/or secondary memory. Computer programs may also be received via the communications interface. Computer programs, when executed, enable the computer system to perform the features of the present invention, as discussed herein. Accordingly, such computer programs represent controllers of the computer system. In an embodiment where the invention is implemented using software, the software may be stored in a computer program product and loaded into the computer system using a removable storage drive, hard drive, or communications interface. The control logic (software), when executed by the processor causes the processor to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s). In one exemplary embodiment, the system for the present invention may be implemented, for example, as a Microsoft.net® desktop application program (Microsoft.net® is made by Microsoft® Corporation of Redmond, Wash.), which may reside on a computer hard drive, database or other repository of data, or be uploaded from the Internet or other network (e.g., from a PC, minicomputer, mainframe computer, microcomputer, telephone device, PDA, or other network device having a processor and input and/or output capability). Any available software tool capable of implementing the concepts described herein may be used to implement the system and method of the present invention. The method and system of the present invention may also be implemented as an application-specific add-on to a program, or as a standalone application.

The present invention provides many benefits. By adding the logic described herein to a ROADM network, troubleshooting, problem isolation and network service restoration is automatically processed by the ROADM system within minutes or seconds, instead of hours of manual troubleshooting, and the general ROADM network reliability and availability can be improved as a result. The same logics here can also be used to enforce wavelength stability requirements on alien laser sources (i.e., those introduced by other carriers or service providers) that are directly connected to a ROADM network.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for limiting an impact of an unstable wavelength channel on other wavelength channels in a reconfigurable optical add/drop multiplexer network, comprising:
    measuring optical channel power at prescribed time intervals;
    for each measurement of optical channel power falling outside a predefined threshold, recording a threshold crossing event;
    comparing the threshold crossing event to stored criteria indicative of an unstable wavelength channel; and
    removing an unstable wavelength of the unstable wavelength channel from the reconfigurable optical add/drop multiplexer network if the threshold crossing event exceeds the stored criteria.

2. The method of claim 1, wherein the predefined threshold comprises maximum or minimum power thresholds and the stored criteria indicative of an unstable wavelength channel comprises a plurality of channel power measurements falling outside the maximum or minimum power thresholds within a specified time window.

3. The method of claim 1, wherein threshold crossing event comprises variations in measured channel power over a specified time window and the stored criteria indicative of an unstable wavelength channel comprises changes in channel power over a specified time window.

4. The method of claim 1, wherein the comparison of the threshold crossing event to the stored criteria is determined by a deviation relative to initial channel power.

5. The method of claim 1, wherein the comparison of the threshold crossing event to the stored criteria is determined by previously measured channel power.

6. The method of claim 1, wherein the comparison of the threshold crossing event to the stored criteria is determined by a sliding average channel power.

7. The method of claim 1, wherein the stored criteria indicative of an unstable wavelength channel are based on a function of threshold crossing event frequency, event time history window, and power deviation magnitude.

8. The method of claim 1, wherein the step of removing the unstable wavelength of the unstable wavelength channel from the reconfigurable optical add/drop multiplexer network further includes moving a mirror in a wavelength selective switch to a blocked position.

9. A system for limiting an impact of an unstable wavelength channel on other wavelength channels in a reconfigurable optical add/drop multiplexer network, comprising:
    means for measuring optical channel power at prescribed time intervals; and
    means for recording a threshold crossing event for each measurement of optical channel power falling outside a predefined threshold, means for comparing the threshold crossing event to stored criteria indicative of an unstable wavelength channel, and means for removing an unstable wavelength of the unstablel wavelength channel from the reconfigurable optical add/drop multiplexer network if the threshold crossing event exceeds the stored criteria.

10. The system of claim 9, wherein the predefined threshold comprises maximum or minimum power thresholds and the stored criteria indicative of an unstable wavelength channel comprises a plurality of channel power measurements falling outside the maximum or minimum power thresholds within a specified time window.

11. The system of claim 9, wherein threshold crossing event comprises variations in measured channel power over a specified time window and the stored criteria indicative of an unstable wavelength channel comprises changes in channel power over a specified time window.

12. The system of claim 9, wherein the comparison of the threshold crossing event to the stored criteria is determined by a deviation relative to initial channel power.

13. The system of claim 9, wherein the comparison of the threshold crossing event to the stored criteria is determined by previously measured channel power.

14. The system of claim 9, wherein the comparison of the threshold crossing event to the stored criteria is determined by a sliding average channel power.

15. The system of claim 9, wherein the stored criteria indicative of an unstable wavelength channel are based on function of threshold crossing event frequency, event time history window, and power deviation magnitude.

16. The system of claim 9, wherein removing the unstable wavelength of the unstable wavelength channel from the reconfigurable optical add/drop multiplexer network further includes moving a mirror in a wavelength selective switch to a blocked position.

* * * * *